United States Patent [19]

Schudel

[11] 4,277,136
[45] * Jul. 7, 1981

[54] REFLECTOR CONSTRUCTION

[76] Inventor: Conrad R. Schudel, 6973 Consolidated Way, San Diego, Calif. 92121

[*] Notice: The portion of the term of this patent subsequent to May 22, 1996, has been disclaimed.

[21] Appl. No.: 39,420

[22] Filed: May 15, 1979

Related U.S. Application Data

[63] Continuation of Ser. No. 856,435, Dec. 1, 1977, Pat. No. 4,155,625.

[51] Int. Cl.³ .............................................. G03B 21/56
[52] U.S. Cl. .................................... 350/125; 160/378
[58] Field of Search ................. 350/125; 160/351, 378

[56] References Cited

U.S. PATENT DOCUMENTS 3,998,522  12/1976  Holzel .................................. 350/125
4,022,522   5/1977  Rain ................................. 350/125 X

FOREIGN PATENT DOCUMENTS 992779  10/1951  France ..................................... 350/125

Primary Examiner—Richard A. Wintercorn
Attorney, Agent, or Firm—Townsend and Townsend

[57] ABSTRACT

A reflector construction is disclosed. A semi-rigid reflector having a curved configuration includes a front reflecting surface and an opposite back surface. A semi-rigid backing has a peripheral margin substantially co-extensive with the periphery of the reflector. The peripheral margin of the backing projects forwardly with respect to the remainder of the backing. The remainder of the backing has a curved configuration generally approximating the curved configuration of the reflector. The peripheral margin of the backing is attaching to the periphery of the back surface of the reflector. The remainder of the backing is thus spaced from the reflector, and the reflector and the backing in combination provide a substantially rigid structure.

14 Claims, 6 Drawing Figures

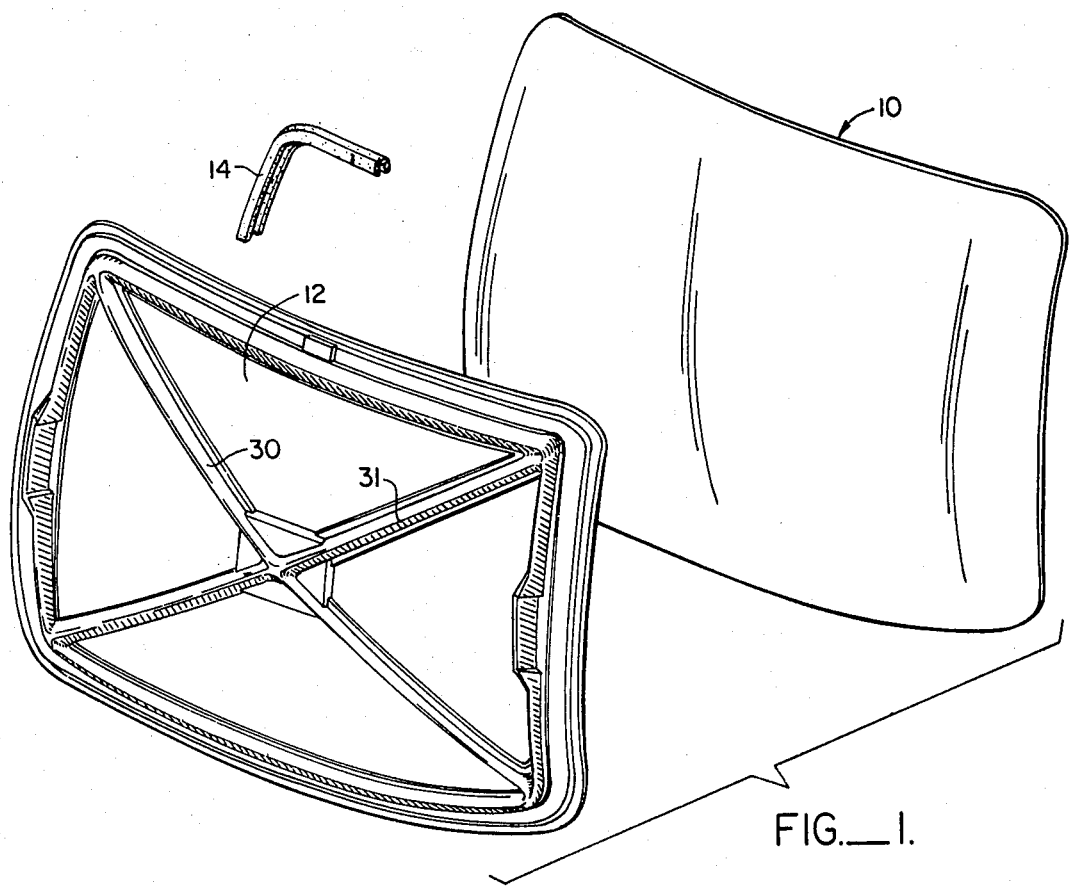
FIG.__1.
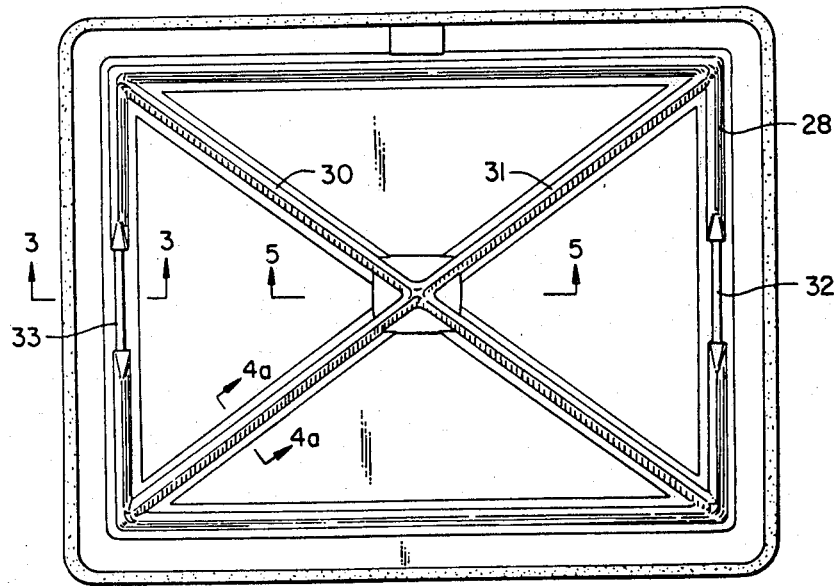
FIG.__2.

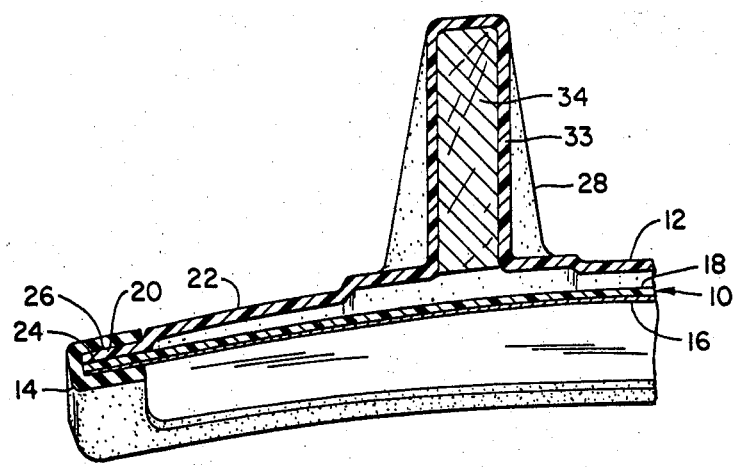
FIG._3.
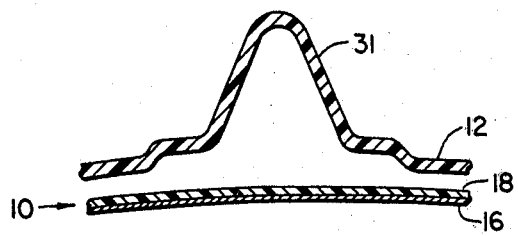
FIG._4a.
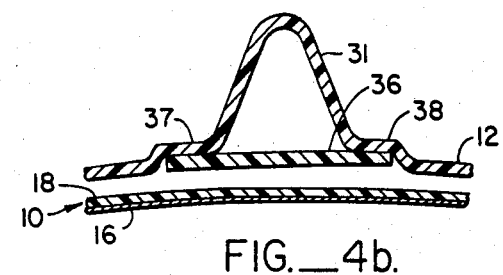
FIG._4b.
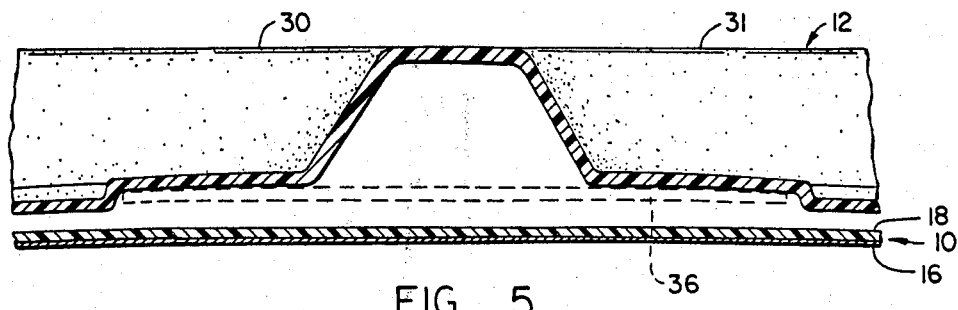
FIG._5.

REFLECTOR CONSTRUCTION

This is a continuation of application Ser. No. 856,435, filed Dec. 1, 1977, now U.S. Pat. No. 4,155,625, issued May 22, 1979.

BACKGROUND OF THE INVENTION

The present invention pertains to a reflector system, and in particular to the construction of a reflector system having a curved front reflecting surface.

The use of large, curved projection screens has relatively recently become quite widespread in certain applications. For example, large screen projection television systems are currently being developed and sold in which the TV image is projected on a screen which is several feet in diameter. In addition, large, curved screens are being used in daytime projection systems for educational and other purposes. In both such applications, the curved screen is necessary to make proper use of high gain reflective materials, as discussed at length in the patent to Chandler, U.S. Pat. No. 3,408,132. Chandler discloses the use of a compression rolled aluminum foil as the reflective material, and other high gain reflective materials can be used as well.

A difficulty arises in mounting the high gain reflective material so that it retains its curved configuration. Generally, such reflective materials, an example of which is compression rolled aluminum foil, have no structural rigidity. The reflective material must be mounted so that the reflecting surface provided thereby is smooth and accurately conforms to the desired curved configuration, and retains its configuration indefinitely.

It has been the practice to mount the high gain reflective material so that it retains its curved configuration by applying a heavy coating of fiberglass or other structural material to the back of the reflecting material. See, e.g., a second patent to Chandler, U.S. Pat. No. 3,655,472. This layer of structural material must be quite thick to provide sufficient structural rigidity to the reflective material over its entire surface, generally constituting 20 or more square feet.

Certain of the deficiencies in known techniques for maintaining the high gain reflective material in its curved configuration are immediately evident. For example, such techniques are relatively inefficient in that they require large quantitites of raw material. Moreover, the backing material increases the weight of the screen, which is undesirable because in most applications for such a screen, it must be somewhat portable. However, perhaps the most significant difficulty with such construction techniques is that the front reflecting surface is quite often distorted while the backing is applied, decreasing the quality of the final product. To obtain an acceptable product using such production techniques exacting measures must often be taken and the construction process becomes quite expensive and time-consuming.

SUMMARY OF THE INVENTION

The present invention provides an improved reflector construction. A semi-rigid reflector having a curved configuration includes a front reflecting surface and an opposite back surface. A semi-rigid backing has a peripheral margin substantially co-extensive with the periphery of the reflector. The peripheral margin of the backing projects forwardly with respect to the remainder of the backing. The remainder of the backing has a curved configuration generally approximating the curved configuration of the reflector. The peripheral margin of the backing is attaching to the periphery of the back surface of the reflector. The remainder of the backing is thus spaced from the reflector, and the reflector and the backing in combination provide a substantially rigid structure.

In the reflector construction of the present invention, the reflector, which includes the front reflective surface, need not be perfectly rigid. As a result, the reflector itself can more readily be constructed without distorting its front reflective surface. The fact that the reflector is semi-rigid allows the reflector to maintain its curved configuration unless the reflector is subjected to bending or torsional forces.

To counteract the vulnerability of the semi-rigid reflector to bending and torsional forces, the backing, which is also semi-rigid, is mounted to the reflector and attached thereto at the outer periphery. The backing is spaced from the reflector except at the outer periphery to provide a monocoque structure which is extremely resistant to bending and torsional forces. However, the weight of the backing and reflector in combination is not large, and the screen and the reflector system can easily be used as part of a portable system. More importantly, perhaps, is that the backing contacts the reflector only around the periphery of the reflector, and the backing does not distort the desired configuration of the front reflecting surface.

The novel features which are characteristic of the invention, as to organization and method of operation, together with further objects and advantages thereof, will be better understood from the following description considered in connection with the accompanied drawings which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an exploded perspective view of the reflector construction of the present invention;

FIG. 2 is a rear elevation view of the reflector construction of the present invention;

FIG. 3 is a fragmentary section view taken along lines 3—3 of FIG. 2;

FIG. 4a is a section view taken along lines 4a—4a of FIG. 2;

FIG. 4b is a fragmentary section view similar to that of FIG. 4a illustrating an alternative embodiment of the present invention;

FIG. 5 is a fragmentary section view taken along lines 5—5 of FIG. 2.

DESCRIPTION OF THE PREFERRED EMBODIMENTS

As depicted in the exploded view of FIG. 1, the reflector construction of the present invention includes two basic structural elements, a reflector 10 and a backing 12. Reflector 10 and backing 12 are normally attached to one another, as discussed previously, but are shown separate in the exploded view of FIG. 1. A resilient loop 14 engages the edges of reflector 10 and backing 12 to provide a border when the backing and reflector are fastened together.

Referring to the Figures in combination, reflector 10 includes a forward reflecting surface 16 which is laminated or otherwise fastened to a structural member 18. Structural element 18 provides reflector 10 with a certain amount of structural rigidity so that reflector 10 will generally maintain its preferred curved configuration. However, structural element 18 is relatively thin, and is not sufficiently rigid to prevent bending and torsional forces from significantly altering the shape of the structural element. Accordingly, reflector element 10 is designated herein as being "semi-rigid".

Backing 12 preferably comprises a single layer of molded plastic material and because it is relatively thin, is also "semi-rigid". Around the periphery 20 of backing 12, the backing projects forwardly somewhat, and accordingly, when backing 12 is placed against reflector 10, only the periphery 20 of the backing contacts the reflector. The remainder 22 of backing 12 has a shape generally corresponding to the curved configuration of reflector 10, but, because of the forwardly projecting periphery 20, is spaced from the reflector itself.

To form the reflector construction of the present invention, backing 12 is bonded to reflector 10 by adhesive layer 24. Because reflector 10 and backing 12 are spaced from one another except around their peripheries, these elements form a monocoque construction which resists strain under bending or torsional forces even though the elements themselves are not completely rigid.

Loop 14 has an inwardly directed channel opening 26 which engages the edges of the reflector 10 and backing 12 when joined together to form an aesthetically pleasing border.

Because backing 12 comprises a relatively thin plastic shell, it is also only semi-rigid, as discussed above. However, to stiffen backing 12 to some degree, a system of ridges are formed in the backing. In the embodiment shown, a rectangular ridge 28 extends around the backing 12 inwardly of the periphery thereof. In addition, diagonal ridges 30, 31 cross at the center of the backing and are integral to the rectangular ridge 28 at the corners thereof. Such ridges provide additional stiffness to backing 12 so that the combination of the backing and reflector 10 is extremely stiff.

On the two sides of the reflector construction, rectangulr ridge 28 has a narrowed portion 32, 33. A wooden block such as 34 is located within each of the narrow portions, and serves as a bulkhead for mounting on the screen. The wooden blocks such as 34 generally form part of the mold used to construct backing 12, and are held in place by adhesion and pressure between the wooden block and the surfaces of the ridge, and do not contact reflector 10.

In order to further increase the structural rigidity of backing 12, plates such as 36 may be bonded to the under side of ridges 30, 31, as illustrated in FIG. 4b, and in phantom in FIG. 5. Each ridge such as 31 has shoulders 37, 38 to accommodate plate 36. The ridges 31, together with plate 36, form a tube construction which can be used to significantly enhance the structural rigidity of backing 12.

While preferred embodiments of the present invention have been illustrated in detail, it is obvious that modifications and adaptations of those embodiments may occur to those skilled in the art. In particular, it is evident that various ridge patterns and other shapes may be employed in backing 12 for added stiffness. However, it is to be expressly understood that such modifications and adaptations are within the spirit and scope of the present invention, as set forth in the following claims.

What is claimed is:

1. A reflector system such as a projection screen comprising:
    a semi-rigid reflector having a curved configuration, said reflector including a front reflecting surface and an opposite back surface;
    a semi-rigid backing having a peripheral margin substantially co-extensive with the periphery of the reflector, said peripheral margin projecting forwardly with respect to the remainder of the backing, said remainder having a curved configuration generally approximating the curved configuration of the reflector; and
    means for attaching the peripheral margin of the backing to the periphery of the back surface of the reflector, the remainder of the backing being spaced from the reflector so that the reflector and the backing in combination provide a substantially rigid structure.

2. A system as recited in claim 1 wherein the backing comprises molded plastic.

3. A system as recited in claim 1 wherein the backing includes diagonal ridges to enhance the structural rigidity of the backing and reflector in combination.

4. A system as recited in claim 3 wherein the backing further includes a rectangular ridge located inwardly of the periphery of the backing and integral with the diagonal ridges to enhance the structural rigidity of the backing and reflector in combination.

5. A system as recited in claim 4 and additionally comprising means for completing the ridges to form enclosed tubes to enhance the structural rigidity of the backing and reflector in combination.

6. A system as recited in claim 1 and additionally comprising a resilient loop having an inwardly directed groove adapted to engage the edges of the backing and reflector in combination to provide a border.

7. A reflector system such as a projection screen comprising:
    a semi-rigid reflector having a curved configuration, said reflector including a reflecting surface and an opposite back surface;
    a semi-rigid backing having a peripheral margin substantially co-extensive with the periphery of the reflector, said peripheral margin projecting forwardly with respect to the remainder of the backing, said remainder having a curved configuration approximating the curved configuration of the reflector, said backing including ridges to enhance the structural rigidity of said backing; and
    means for attaching the peripheral margin of the backing to the periphery of the back surface of the reflector, the remainder of the backing being spaced from the reflector so that the reflector and the backing in combination provide a substantially rigid structure.

8. A system as recited in claim 7 wherein the ridges include diagonal ridges.

9. A system as recited in claim 7 wherein the ridges include a rectangular ridge located inward of the periphery of the backing.

10. A system as recited in claim 9 and additionally comprising a pair of wooden blocks located within the rectangular ridge to provide bulkheads for mounting the reflector system.

11. A system as described in claim 7 wherein the backing comprises molded plastic.

12. A system as recited in claim 7 and additionally comprising a resilient loop having an inwardly directed groove adapted to engage the edges of the backing and reflector in combination to provide a border.

13. A system as recited in claim 7 and additionally comprising means for completing the ridges to form enclosed tubes to enhance the structural rigidity of the backing and reflector in combination.

14. A system as recited in claim 1 or 7 in which said attaching means comprises means for adhesively bonding the peripheral margin of the backing to the periphery of the back surface of the reflector.

* * * * *